(12) United States Patent
Hu

(10) Patent No.: US 9,864,521 B2
(45) Date of Patent: Jan. 9, 2018

(54) PERIPHERAL DEVICE COMPLYING WITH SDIO STANDARD AND METHOD FOR MANAGING SDIO COMMAND

(71) Applicant: MEDIATEK INC., Hsin-Chu (TW)

(72) Inventor: Chao-Yu Hu, Miaoli County (TW)

(73) Assignee: MEDIATEK INC., Hsin-Chu (TW)

( * ) Notice: Subject to any disclaimer, the term of this patent is extended or adjusted under 35 U.S.C. 154(b) by 133 days.

(21) Appl. No.: 14/586,824

(22) Filed: Dec. 30, 2014

(65) Prior Publication Data

US 2015/0120964 A1 Apr. 30, 2015

Related U.S. Application Data

(63) Continuation of application No. 12/246,853, filed on Oct. 7, 2008, now abandoned.

(30) Foreign Application Priority Data

Dec. 19, 2007 (TW) .............................. 096148689 A

(51) Int. Cl.
*G06F 3/06* (2006.01)
*G06F 13/42* (2006.01)

(52) U.S. Cl.
CPC ............ *G06F 3/061* (2013.01); *G06F 3/0659* (2013.01); *G06F 3/0673* (2013.01); *G06F 13/42* (2013.01); *G06F 2003/0691* (2013.01)

(58) Field of Classification Search
CPC ............ H04L 29/12028; H04L 61/103; G06F 13/385; G06F 1/3203; G06F 1/3215; G06F 1/3237; G06F 1/3259; G06F 1/3271; G06F 2213/3814; G06F 3/0231; G06F 3/03543; G06F 3/038; G06F 3/0383; H04W 52/04; H04W 52/28; H04W 52/287
USPC ........... 709/225, 232, 20; 370/412, 458, 468
See application file for complete search history.

(56) References Cited

U.S. PATENT DOCUMENTS

| | | | |
|---|---|---|---|
| 7,664,898 B2 * | 2/2010 | Jin | G06F 13/4221 710/106 |
| 7,787,026 B1 * | 8/2010 | Flory | H04N 1/2166 348/231.99 |
| 7,827,323 B2 * | 11/2010 | Bar-Shalom | G06F 13/28 710/22 |
| 8,161,276 B2 * | 4/2012 | Elshocht | G06F 1/3228 713/1 |

(Continued)

*Primary Examiner* — Ninos Donabed
(74) *Attorney, Agent, or Firm* — Winston Hsu

(57) ABSTRACT

The invention provides a method of managing SDIO commands at a host device and a peripheral device. The host device connected to the peripheral device by a bus comprising a command transmission line and a data transmission line, both of which are arranged to transmit single end signal. The host device converts operation requests into converted commands and combines a first SDIO complied data packet with the converted commands to generate a first combined data packet. Then, the host device transmits the first combined data packet through the data transmission line, wherein the first combined data packet comprises a first header for indicating whether the first combined data packet comprises the converted commands. After receiving the first combined data packet, the peripheral device parses the first combined data packet to obtain the converted commands, and then performs processing procedures according to the converted commands.

16 Claims, 5 Drawing Sheets

(56) References Cited

U.S. PATENT DOCUMENTS

| | | | |
|---|---|---|---|
| 2005/0197017 A1* | 9/2005 | Chou et al. | 439/660 |
| 2006/0015673 A1* | 1/2006 | Morrow | 710/315 |
| 2007/0079044 A1* | 4/2007 | Mandal et al. | 710/310 |
| 2007/0180173 A1* | 8/2007 | Jin | G06F 13/4221 710/105 |
| 2008/0008154 A1* | 1/2008 | Mizukoshi | 370/347 |
| 2008/0140787 A1 | 6/2008 | Shima | |
| 2008/0140878 A1* | 6/2008 | Bar-Shalom | G06F 13/28 710/26 |
| 2009/0293072 A1* | 11/2009 | Elshocht | G06F 1/3228 719/327 |
| 2009/0327676 A1* | 12/2009 | Elshocht | G06F 1/3228 713/1 |

\* cited by examiner

PERIPHERAL DEVICE COMPLYING WITH SDIO STANDARD AND METHOD FOR MANAGING SDIO COMMAND

CROSS REFERENCE TO RELATED APPLICATIONS

This is a continuation application of U.S. application Ser. No. 12/246,853.

BACKGROUND OF THE INVENTION

1. Field of the Invention

The invention relates to a peripheral device complying with Secure Digital Input/Output (SDIO) standard and a method for managing SDIO command, more particularly, to a peripheral device and method used to convert an operation request into a converted command and to transmit the converted command combined with a packet.

2. Description of the Prior Art

In a general SDIO frame, a peripheral device complying with SDIO standard is connected to a host device complying with SDIO standard. According to SDIO standard, some commands complying with SDIO command format (such as CMD_52 format) are used to perform the processing procedure for reading or writing single byte. After receiving the command, the peripheral device transmits a return receipt to a host device for returning what performs the command.

However, some host devices complying with SDIO standard are based on a multiplexing mechanism. When there are some commands needed to be processed, each command is processed completely (which comprises transmitting the command and receiving the return receipt), and there is a long interval before the next command to be processed, so the processing efficiency of the command is decreased.

Please refer to FIG. 1. FIG. 1 is a schematic diagram illustrating a time interval of general SDIO system frame for processing a plurality of commands. For example, when two commands CMD1 and CMD2 complying with CMD_52 format will be processed, first of all, a command CMD1 is transmitted to the peripheral device via the host device. The host device then receives the return receipt RP1 from the peripheral device which is corresponding to the command CMD1. The time of the host device transmitting the command CMD_1 to receive the return receipt RP1 is about 100 periods (T). However, due to the inherent limitation of the multiplexing mechanism, the host device transmits the command CMD2 to the peripheral device after about 10000 T. In other words, if there are more commands complying with CMD_52 format needed to be processed, the interval time of processing each command is getting longer and longer, so it obviously decreases the efficiency of the SDIO system.

Therefore, the main scope of the invention is to provide a peripheral device complying with SDIO standard and a method, so as to solve the aforesaid problems.

SUMMARY OF THE INVENTION

An object of the present invention is to provide a peripheral device complying with SDIO standard and a method for managing the SDIO command. The present invention is used for transmitting a combined packet with a command which is originally set to be transmitted. Thereby, the invention is capable of processing with a shorter interval between commands, so as to enhance the efficiency of processing SDIO command.

According an embodiment of the invention, the method is used for managing SDIO command at a host device. Wherein the host device connects a bus comprising a command transmission line and a data transmission line, both of which are arranged to transmit single end signal. The host device firstly converts operation requests into converted commands, and then combines a first SDIO complied data packet with the converted commands so as to generate a first combined data packet. Finally, the host device transmits the first combined data packet through the data transmission line, wherein the first combined data packet comprises a first header for indicating whether the first combined data packet comprises the converted commands.

According to another embodiment of the invention, a peripheral device complies with SDIO standard and is connected to a host device complying with SDIO standard. The peripheral device connected to the host device by a bus comprising a command transmission line and a data transmission line, both of which are arranged to transmit single end signal. The host device firstly converts operation requests into converted commands, and then combines a first SDIO complied data packet with the converted commands so as to generate a first combined data packet. Finally, the host device transmits the first combined data packet through the data transmission line, wherein the first combined data packet comprises a first header for indicating whether the first combined data packet comprises the converted commands. The peripheral device comprises a receiving module, a parsing module and a performing module. The receiving module is used for receiving the first combined data packet through the data transmission line. The parsing module is coupled to the receiving module and is used for parsing the first data combined packet so as to obtain the converted commands. The performing module is coupled to the parsing module and is used for performing processing procedures according to the converted commands.

According to another embodiment of the invention, the method is used for managing SDIO command at a peripheral device, wherein the peripheral device connects a bus comprising a command transmission line and a data transmission line, both of which are arranged to transmit single end signal. The peripheral device firstly receives a first combined data packet through the data transmission line, and then parses the first combined data packet to obtain converted commands according to a first header of the first combined packet. Wherein the first combined data packet is generated by combining a first SDIO complied data packet with converted commands, and the first header of the first combined data packet indicates the first combined packet comprises the converted commands. Finally, the peripheral device performs processing procedures according to the converted commands.

According to another embodiment of the invention, the method is used for managing SDIO command at a host device, wherein the host device connects a bus comprising a command transmission line and a data transmission line. Firstly, the host device converts operation requests into converted commands and combines a first SDIO complied data packet with the converted commands to generate a first combined data packet. Then, a command packet complying SDIO command format is transmitted through the command transmission line by the host device for notifying a peripheral device the first combined data packet would be transmitted later. Finally, the first combined data packet is transmitted by the host device through the data transmission line, wherein the first combined data packet comprises a first header for indicating whether the first combined data packet comprises the converted commands, and both of the command transmission line and the data transmission line are arranged to transmit single end signal.

According to another embodiment of the invention, a peripheral device complies with SDIO standard and is connected to a host device complying with SDIO standard, wherein the peripheral device connected to the host device by a bus comprising a command transmission line and a data transmission line. Firstly, the host device converts operation requests into converted commands and combines a first SDIO complied data packet with the converted commands to generate a first combined data packet. Then, a command packet complying SDIO command format is transmitted through the command transmission line by the host device for notifying a peripheral device the first combined data packet would be transmitted later. Finally, the first combined data packet is transmitted by the host device through the data transmission line, wherein the first combined data packet comprises a first header for indicating whether the first combined data packet comprises the converted commands, and both of the command transmission line and the data transmission line are arranged to transmit single end signal. The peripheral device comprises a first receiving module, a second receiving module, a parsing module and a performing module. The first receiving module is used for receiving the command packet through the command transmission line. The second receiving module is for receiving the first combined data packet through the data transmission line. The parsing module is coupled to the receiving module and is used for parsing the first data combined packet to obtain the converted commands. The performing module is coupled to the parsing module and is used for performing processing procedures according to the converted commands.

According to another embodiment of the invention, the method is used for managing SDIO command at a peripheral device, wherein the peripheral device connects a bus comprising a command transmission line and a data transmission line. Firstly, after receiving a command packet through the command transmission line for notifying the peripheral device a first combined data packet would be received later, the peripheral device receives the first combined data packet through the data transmission line, wherein the first combined data packet is generated by combining a first SDIO complied data packet with converted commands. Then, the peripheral device parses the first combined data packet so as to obtain converted commands according to a first header of the first combined packet, wherein the first header of the first combined data packet indicates the first combined packet comprises the converted commands. Finally, the peripheral device performs processing procedures according to the converted commands.

According to the present invention, the peripheral device and the method for managing commands are used for transmitting the combined packet with the command which is originally set to be transmitted. Thereby, the invention is capable of processing with shorter intervals between the commands, so as to enhance the efficiency of processing SDIO command.

The advantage and spirit of the invention may be understood by the following recitations with the appended drawings.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a peripheral device complying with SDIO standard and a method for managing the SDIO command. And the present invention is used for transmitting a combined packet with a command which is originally set to be transmitted. Thereby, the present invention is capable of processing less time interval between commands, so as to enhance the efficiency of processing SDIO command.

Figure 1:
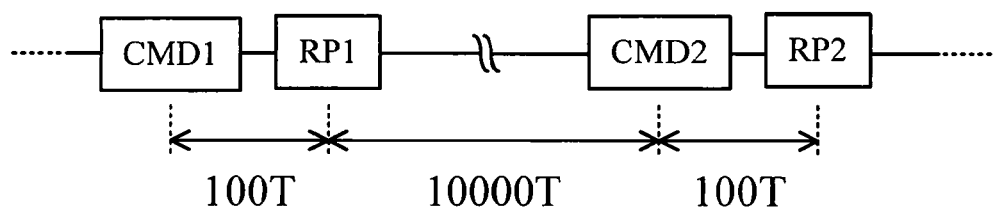
FIG. 1 is a schematic diagram illustrating the time interval of a general SDIO system frame for processing the commands.
Figure 2:
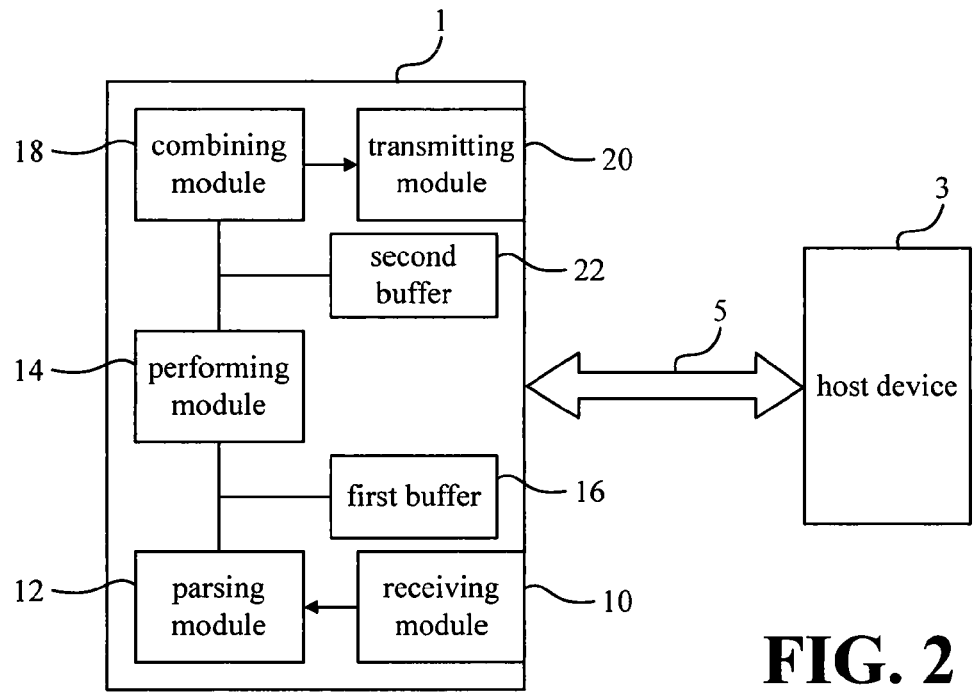
FIG. 2 is a functional block diagram illustrating a peripheral device according to an embodiment of the invention.

Please refer to FIG. 2. FIG. 2 is a functional block chart illustrating a peripheral device 1 complying with SDIO standard according to an embodiment of the invention. In this embodiment, the peripheral device 1 complying with SDIO standard is used for receiving a packet from a host device 3. According to the present invention, an SD bus 5 connects the peripheral device 1 and the host device 3. The SD bus 5 comprises a command transmission line and a data transmission line.

In this embodiment, the host device 3 originally plans to convert the operation request into the command complying with an SDIO command format, and then transmits the command to the peripheral device 1. According to the present invention, the command is originally set to be transmitted to the peripheral device 1 by the host device 3 via the command transmission line of SD bus 5. According to the present invention, the operation request and the command complying with the SDIO command format is not limited to one, but can respectively be a plurality.

If the host device 3 originally plans to transmit a first packet complying with an SDIO data format to the peripheral device 1, before transmitting the first packet to the peripheral device 1, the host device 3 converts the operation request into a converted command. In other words, the operation that the host device 3 originally plans to convert the operation request into the command complying with the SDIO data format is replaced by the operation of converting the operation request into the converted command. Practically, before transmitting the first packet to the peripheral device 1, the host device 3 transmits a packet complying with another SDIO command format to the peripheral device 1, so as to notify the peripheral device 1 that the host device 3 will transmit the first packet.

Further, the host device 3 can combine the first packet with the converted command, so as to generate a first combined packet. It is worthy to notice that there are a plurality of the operation requests with the commands, so the converted commands also can be a plurality. In other words, the host devices 3 can combine the first packet with a plurality of converted commands, so as to generate the first combined packet. In short, the first combined packet can comprise a plurality of converted commands, so as to enhance the transmission efficiency.

Figure 3A:
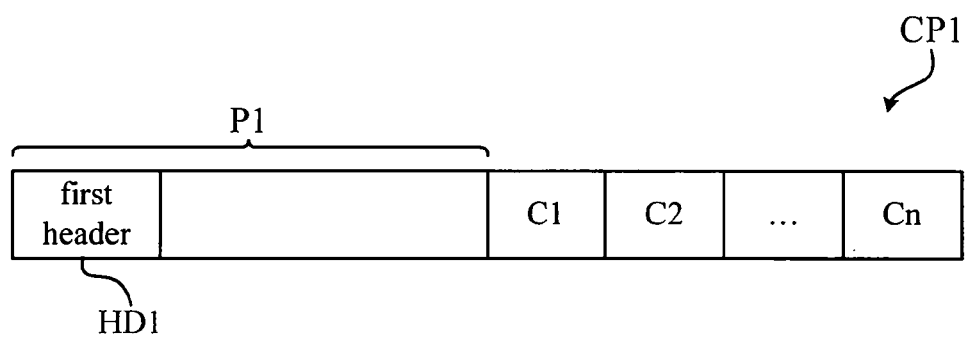
FIG. 3A is a schematic diagram illustrating the format of a first combined packet.

Please refer to FIG. 3A. FIG. 3A is a schematic diagram illustrating the format of the first combined packet CP1. According to the present invention, the host device 3 is connected in series between the first packet P1 and the converted commands C1 through Cn, so as to generate the first combined packet CP1, as shown in FIG. 3.

Figure 3B:
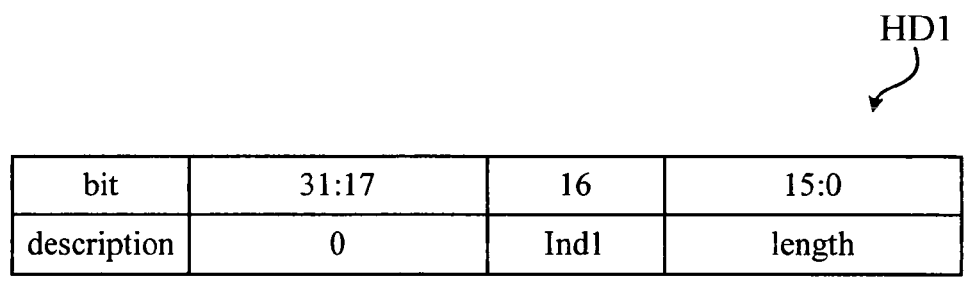
FIG. 3B is a schematic diagram illustrating the format of the first combined packet containing the first header in FIG. 3A.

Please refer to FIG. 3B. FIG. 3B is a schematic diagram illustrating the format of the first combined packet CP1 containing a first header HD1. According to the present invention, the first combined packet CP1 can comprise the first header HD1 for indicating whether the first combined packet CP1 comprises the converted commands C1 through Cn. For example, the first header HD1 can comprise a first indicating bit Ind1 for indicating whether the first combined packet CP1 comprises the converted commands C1 through Cn, as shown in FIG. 3B.

Finally, the host device 3 transmits the first combined packet to the peripheral device 1. On the other hand, the host device 3 transmits the first combined packet replaced with the first packet to the peripheral device 1, wherein the first combined packet comprises the converted command. According to the present invention, the host device 3 transmits the first combined packet to the peripheral device 1 via the data transmission line of SD bus 5.

Thereby, when there are a plurality of commands originally set to be transmitted to the peripheral device 1 via the host device 3, a plurality of converted commands can replace the commands, and then the host device 3 can transmit the converted commands with the first combined packet to the peripheral device 1. As described as in prior arts, the time interval of the host device 3 when processing a plurality of commands can decrease the processing efficiency, so the method is to replace the command with the converted command and transmit the converted command combined with the first combined packet, so as to decrease the time interval of processing plurality of commands and further enhancing the processing efficiency.

As shown in FIG. 2, the peripheral device 1 comprises a receiving module 10, a parsing module 12, and a performing module 14. The parsing module 12 is coupled to the receiving module 10, and the performing module 14 is coupled to the parsing module 12.

In this embodiment, the receiving module 10 is used for receiving the first combined packet. The parsing module 12 is used for parsing the first combined packet, so as to obtain the converted command. And the performing module 14 is used for performing a processing procedure based on the converted command.

According to the present invention, the peripheral device 1 can further comprise a first buffer 16 coupled between the parsing module 12 and the performing module 14 for buffering the converted command. Practically, the first buffer 16 can be a first in first out (FIFO) buffer, but not limited to it.

According to the present invention, when the converted command is a write command, the processing procedure is a write procedure. After receiving the converted command, the performing module 14 performs the write procedure based on the converted command.

According to the present invention, when the converted command is a read command, the processing procedure is a read procedure. After the performing module 14 performs the read procedure to generate a return receipt, the peripheral device further comprises a combining module 18 and a transmitting module 20, and the transmitting module 20 is coupled to the combining module 18, as shown in FIG. 2. According to the present invention, the peripheral device 1 can further comprise a second buffer 22, which is coupled between the performing module 14 and the combining module 18, for buffering the return receipt. Practically, the second buffer 22 can be the FIFO buffer, but not to limited to it.

If the peripheral device 1 is originally set to transmit a second packet complying with a second data format to the host device 3, before transmitting the second packet, the combined module 18 can combine the second packet with the return receipt, so as to generate a second combined packet. Then the transmitting module 20 can transmit the second combined packet to the host device 3. It is worth noticing that the converted commands are plural, so the return receipts are also plural.

Figures 4A, 4B:
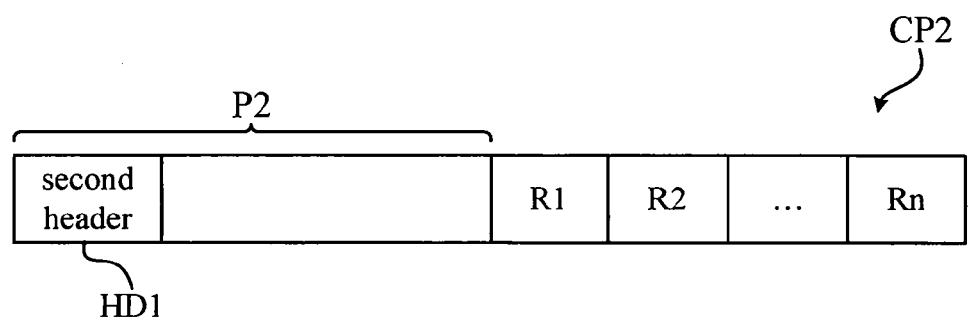
FIG. 4A is a schematic diagram illustrating the format of a second combined packet.
FIG. 4B is a schematic diagram illustrating the format of the second combined packet containing the second header in FIG. 4A.

Please refer to FIG. 4A. FIG. 4A is a schematic diagram illustrating a format of the second combined packet CP2. According to the present invention, the host device 3 is connected in series to combine the second packet P2 with the return receipt R1 through Rn to generate the second combined packet CP2, as shown in FIG. 4.

Please refer to FIG. 4B. FIG. 4B is a schematic diagram illustrating the format of the second combined packet CP2 containing a second header HD2. According to the present invention, the second combined packet CP2 can comprise the second header HD2 for indicating whether the second combined packet CP2 comprises the return receipts R1 through Rn. For example, the second header HD2 can comprise a second indicating bit Ind2 to indicate whether the second combined packet CP2 comprises the return receipts R1 through Rn, as shown in FIG. 4B.

If the second packet is not transmitted to the host device 3 in advance, the host device 3 will immediately receive the return receipt. Then the host device 3 can selectively transmit a special read command for reading the return receipt from the second buffer 22.

According to the method of converting and combining, the summaries of commands complying with SDIO command format can be decreased, so as to decrease the time interval of processing the commands and further to enhance the system efficiency.

Figure 5:
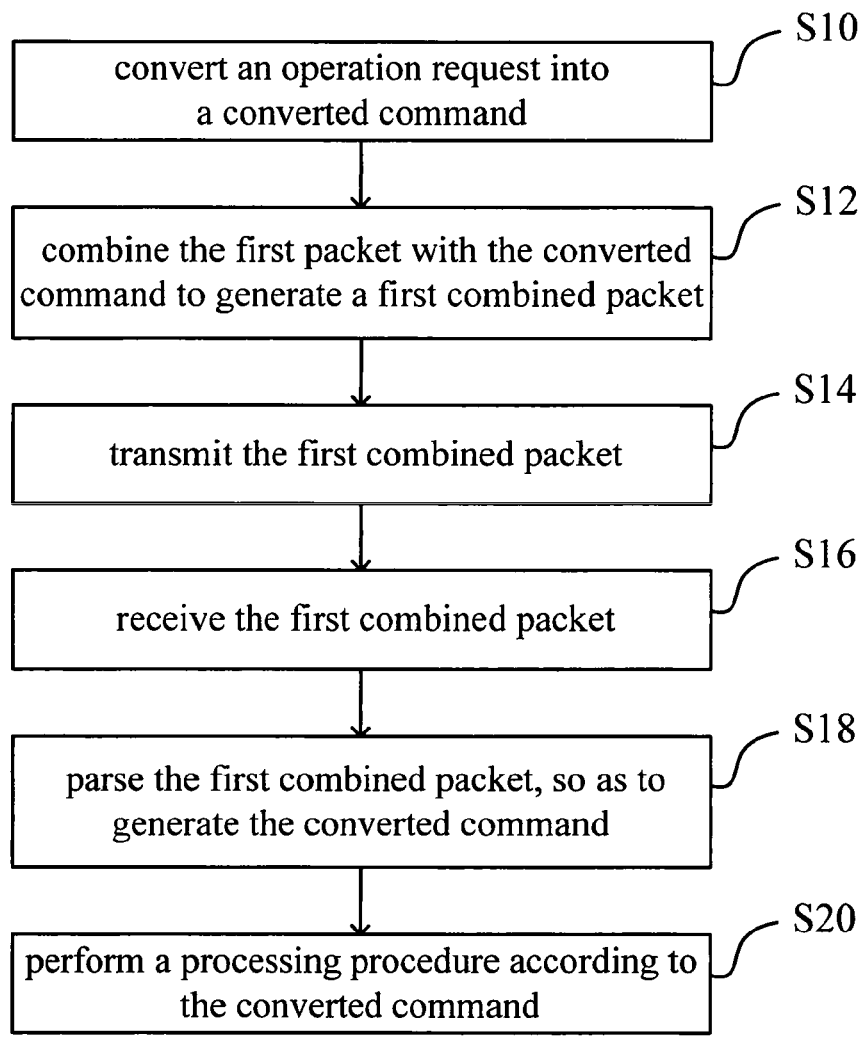
FIG. 5 is a flow chart showing a method for managing SDIO command according to another embodiment of the invention.

Please refer to FIG. 5, which is a flow chart illustrating a method for managing SDIO commands according to another embodiment of the invention. The method for managing SDIO command is shown in FIG. 5. First of all, step S10 is performed to convert an operation request into a converted command before the first packet complying with the first SDIO data format is transmitted, wherein the operation request is originally set to be converted into the command complying with an SDIO command format, and the command is originally set to be transmitted.

Further, step S12 is performed to combine the first packet with the converted command to generate the first combined packet. According to the present invention, the first combined packet comprises the first header for indicating whether the first combined packet comprises the converted command.

However, step S14 is performed to transmit the first combined packet. Further, step S16 is performed to receive the first combined packet. And further still, step S18 is performed to parse the first combined packet, so as to obtain the converted command. Finally, step S20 is performed to perform a processing procedure according to the converted command. According to the present invention, when the converted command is the write command, the processing procedure is the write procedure.

Figure 6:
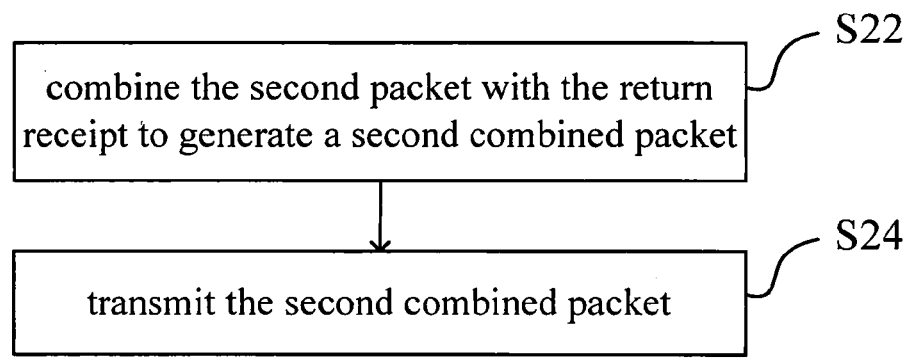
FIG. 6 is a flow chart showing the method for combing and transmitting the return receipt.

Please refer to FIG. 6, which is a flow chart illustrating the method for combining and transmitting the return receipt. According to the present invention, when the converted command is the read command, the processing procedure is the read procedure, which is performed to generate the return receipt. The method can further comprise the steps as follows. As shown in FIG. 6, first of all, step S22 is performed to combine the second packet with the return receipt to generate a second combined packet before the second packet complying with a second SDIO data format is transmitted. Finally, step S24 is performed to transmit the second combined packet. According to the present invention, the second combined packet comprises a second header for indicating whether the second combined packet comprises the return receipt.

Compared to the prior arts, according to the present invention, a peripheral device complying with SDIO standard and a method for managing SDIO command can transmit the packet combined with the command which is originally set to be transmitted. Thereby, the invention can shorten the time interval between the commands, so as to enhance the efficiency of processing SDIO command. In addition, when the command is the read command, the return receipt combined with the packet also can be transmitted, so as to enhance the processing efficiency.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing Secure Digital Input/Output (SDIO) commands at a host device, wherein the host device connects a bus comprising a command transmission line and a data transmission line, wherein the command transmission line and the data transmission line are arranged to transmit single end signal, the method comprising steps of:
   converting operation requests into converted commands;
   combining a first SDIO complied data packet with the converted commands, so as to generate a first combined data packet; and
   transmitting the first combined data packet through the data transmission line;
   wherein the combining step comprises connecting the converted commands in series to the end of the first SDIO complied data packet, the first SDIO complied data packet comprises a first header, which is converted to a second header after the combining step, wherein the second header comprises a bit for indicating the first combined data packet comprises the converted commands, and the bit is not existed in the first SDIO complied data packet;
   wherein the operation requests are originally set to be converted into commands complying with an SDIO command format, the commands are originally set to be transmitted, and the step of converting the operation requests into the converted commands is performed before the first SDIO complied data packet is transmitted.

2. The method of claim 1, wherein one of the converted commands is a read command or a write command.

3. A peripheral device complying with an SDIO standard and being used for receiving a packet from a host device, the peripheral device connected to the host device by a bus comprising a command transmission line and a data transmission line, wherein the command transmission line and the data transmission line are arranged to transmit single end signal, wherein the host device converts operation requests into converted commands, combines a first SDIO complied data packet with the converted commands to generate a first combined data packet, and transmits the first combined data packet to the peripheral device through the data transmission line, wherein the host connects the converted commands in series to the end of the first SDIO complied data packet, the first SDIO complied data packet comprises a first header, which is converted to a second header after the combining step, wherein the second header comprises a bit for indicating the first combined data packet comprises the converted commands, and the bit is not existed in the first SDIO complied data packet, the peripheral device comprising:
   a receiving module for receiving the first combined data packet through the data transmission line;
   a parsing module, coupled to the receiving module, for parsing the first data combined packet, so as to obtain the converted commands; and
   a performing module, coupled to the parsing module, for performing processing procedures according to the converted commands;
   wherein the operation requests are originally set to be converted into commands complying with an SDIO command format by the host device, the commands are originally set to be transmitted to the peripheral device by the host device, and the host device converts the operation requests into the converted commands before the first SDIO complied data packet is transmitted.

4. The peripheral device of claim 3, further comprising a first buffer, coupled between the parsing module and the performing module, for buffering the converted commands.

5. The peripheral device of claim 3, wherein one of the converted commands is a read command, one of the processing procedures corresponding to the read command is a read procedure, and the performing module performs the procedures to generate return receipts, the peripheral device is further configured for combining a second packet with the return receipts, so as to generate a second combined packet, and for transmitting the second combined packet to the host device.

6. The peripheral device of claim 5, further comprising a second buffer, for buffering the return receipts.

7. The peripheral device of claim 5, wherein the second combined packet comprises a second header for indicating whether the second combined packet comprises the return receipts.

8. The peripheral device of claim 3, wherein one of the convened commands is a write command, and one of the processing procedures corresponding to the write command is a write procedure.

9. The peripheral device of claim 3, wherein an SD bus connects the peripheral device and the host device.

10. A method for managing SDIO commands at a peripheral device, wherein the peripheral device connected to a host device by a bus comprising a command transmission line and a data transmission line, wherein the command transmission line and the data transmission line are arranged to transmit single end signal, wherein the host device converts operation requests into converted commands, combines a first SDIO complied data packet with the converted commands to generate a first combined data packet, and transmits the first combined data packet to the peripheral device through the data transmission line, wherein the host connects the converted commands in series to the end of the first SDIO complied data packet, the first SDIO complied data packet comprises a first header, which is converted to a second header after the combining step, wherein the second header comprises a bit for indicating the first combined data packet comprises the converted commands, and the bit is not existed in the first SDIO complied data packet, the method comprising steps of:
receiving the first combined data packet through the data transmission line;
parsing the first combined data packet so as to obtain the converted commands according to the first header of the first combined packet; and
performing processing procedures according to the converted commands;
wherein the operation requests are originally set to be converted into commands complying with an SDIO command format by the host device, the commands are originally set to be transmitted to the peripheral device by the host device, and the host device converts the operation requests into the converted commands before the first SDIO complied data packet is transmitted.

11. The method of claim 10, further comprising steps of:
generating return receipts corresponding to the converted commands;
combing a second SDIO complied data packet with the return receipts so as to generate a second combined packet; and
transmitting the second combined packet.

12. The method of claim 11, wherein the second combined packet comprises a second header for indicating whether the second combined packet comprises the return receipts.

13. The method of claim 10, wherein one of the converted commands is a read command or a write command and one of the processing procedures corresponding to the read command or the write command is a read processing procedure or a write processing procedure respectively.

14. A method for managing Secure Digital Input/Output (SDIO) commands at a host device, wherein the host device connects a bus comprising a command transmission line and a data transmission line, the method comprising steps of:
converting operation requests into converted commands;
combining a first SDIO complied data packet with the converted commands, so as to generate a first combined data packet;
transmitting a command packet complying SDIO command format through the command transmission line for notifying peripheral device the first combined data packet would be transmitted later; and
transmitting the first combined data packet through the data transmission line;
both of the command transmission line and the data transmission line are arranged to transmit single end signal;
wherein the combining step comprises connecting the converted commands in series to the end of the first SDIO complied data packet, the first SDIO complied data packet comprises a first header, which is converted to a second header after the combining step, wherein the second header comprises a bit for indicating the first combined data packet comprises the converted commands, and the bit is not existed in the first SDIO complied data packet;
wherein the operation requests are originally set to be converted into commands complying with an SDIO command format, the commands are originally set to be transmitted, and the step of converting the operation requests into the converted commands is performed before the first SDIO complied data packet is transmitted.

15. A peripheral device complying with an SDIO standard and being used for receiving a packet from a host device, the peripheral device connected to the host device by a bus comprising a command transmission line and a data transmission line, wherein the host device converts operation requests into converted commands, combines a first SDIO complied data packet with the converted commands to generate a first combined data packet, transmit a command packet complying SDIO command format through the command transmission line for notifying the peripheral device the first combined data packet would be transmitted later, and transmits the first combined data packet to the peripheral device through the data transmission line, wherein the host connects the converted commands in series to the end of the first SDIO complied data packet, the first SDIO complied data packet comprises a first header, which is converted to a second header after the combining step, wherein the second header comprises a bit for indicating the first combined data packet comprises the converted commands, and the bit is not existed in the first SDIO complied data packet, the peripheral device comprising:
a first receiving module for receiving the command packet through the command transmission line;
a second receiving module for receiving the first combined data packet through the data transmission line;
a parsing module, coupled to the second receiving module, for parsing the first combined data packet, so as to obtain the converted commands; and
a performing module, coupled to the parsing module, for performing processing procedures according to the converted commands;
wherein the operation requests are originally set to be converted into commands complying with an SDIO command format by the host device, the commands are originally set to be transmitted to the peripheral device by the host device, and the host device converts the operation requests into the converted commands before the first SDIO complied data packet is transmitted.

16. A method for managing SDIO commands at a peripheral device, wherein the peripheral device connected to a host device by a bus comprising a command transmission line and a data transmission line, wherein the command transmission line and the data transmission line are arranged to transmit single end signal, wherein the host device converts operation requests into converted commands, combines a first SDIO complied data packet with the converted commands to generate a first combined data packet, and transmits the first combined data packet to the peripheral device through the data transmission line, wherein the host connects the converted commands in series to the end of the first SDIO complied data packet, the first SDIO complied data packet comprises a first header, which is converted to a second header after the combining step, wherein the second header comprises a bit for indicating the first combined data packet comprises the converted commands, and the bit is not existed in the first SDIO complied data packet, the method comprising steps of:

receiving a command packet through the command transmission line for notifying the peripheral device a first combined data packet would be received later;

receiving the first combined data packet through the data transmission line;

parsing the first combined data packet so as to obtain the converted commands according to the first header of the first combined packet; and performing processing procedures according to the converted commands;

wherein the operation requests are originally set to be converted into commands complying with an SDIO command format by the host device, the commands are originally set to be transmitted to the peripheral device by the host device, and the host device converts the operation requests into the converted commands before the first SDIO complied data packet is transmitted.

\* \* \* \* \*